(12) United States Patent
Mayrench et al.

(10) Patent No.: US 8,917,796 B1
(45) Date of Patent: Dec. 23, 2014

(54) TRANSMISSION-MODE-AWARE RATE MATCHING IN MIMO SIGNAL GENERATION

(75) Inventors: Ronen Mayrench, Ra'anana (IL); Ezer Melzer, Tel Aviv (IL)

(73) Assignee: Marvell International Ltd., Hamilton (BM)

( * ) Notice: Subject to any disclaimer, the term of this patent is extended or adjusted under 35 U.S.C. 154(b) by 939 days.

(21) Appl. No.: 12/903,237

(22) Filed: Oct. 13, 2010

Related U.S. Application Data

(60) Provisional application No. 61/252,991, filed on Oct. 19, 2009.

(51) Int. Cl.
H04L 27/00 (2006.01)

(52) U.S. Cl.
USPC ........... 375/299; 375/260; 375/267; 375/296; 375/325; 375/347

(58) Field of Classification Search
CPC ...... H04L 1/06; H04L 1/1893; H04B 7/0413; H04B 7/02; H04B 7/0486
USPC ................. 375/130–133, 140–153, 259–285, 375/295–302, 316–325, 340–343, 346–350
See application file for complete search history.

(56) References Cited

U.S. PATENT DOCUMENTS

| | | | |
|---|---|---|---|
| 5,231,629 A | 7/1993 | Kotzin et al. | |
| 5,263,160 A | 11/1993 | Porter, Jr. et al. | |
| 5,349,567 A | 9/1994 | Reed | |
| 5,940,439 A | 8/1999 | Kleider et al. | |
| 6,466,904 B1 | 10/2002 | Gao et al. | |
| 6,512,750 B1 | 1/2003 | Palenius | |
| 6,757,319 B1 | 6/2004 | Parsa et al. | |
| 6,865,237 B1 | 3/2005 | Boariu et al. | |
| 7,839,944 B2 | 11/2010 | Lee et al. | |
| 7,941,186 B2 | 5/2011 | Cho et al. | |
| 8,036,286 B2 | 10/2011 | Lee et al. | |

(Continued)

FOREIGN PATENT DOCUMENTS

| | | |
|---|---|---|
| EP | 2182754 A1 | 5/2010 |
| JP | 2008236222 A | 2/2008 |

(Continued)

OTHER PUBLICATIONS

U.S. Appl. No. 12/965,878 Official Action dated Apr. 1, 2013.

(Continued)

*Primary Examiner* — Sam K Ahn
*Assistant Examiner* — James M Perez

(57) ABSTRACT

A method in a Multiple-Input Multiple-Output (MIMO) transmitter includes selecting a transmission mode from a group of modes including a spatial multiplexing mode and a transmit diversity mode. A rate matching parameter is set depending on at least the selected transmission mode. Data for transmission is formatted in one or more transport blocks, each transport block including multiple code blocks having respective lengths, in symbols, that are respective integer multiples of the rate matching parameter. The code blocks of a given transport block are mapped onto time-frequency resource elements in accordance with the selected transmission mode, such that each resource element contains data originating from only a respective one of the code blocks of the given transport block. The code blocks of the given transport block are transmitted over the time-frequency resource elements to a receiver.

18 Claims, 2 Drawing Sheets

(56) References Cited

U.S. PATENT DOCUMENTS

| | | |
|---|---|---|
| 8,068,555 B2 | 11/2011 | Jongren et al. |
| 8,098,750 B2 | 1/2012 | Mueck et al. |
| 8,179,775 B2 | 5/2012 | Chen et al. |
| 8,325,844 B2 * | 12/2012 | Walton et al. .................. 375/267 |
| 2002/0001333 A1 | 1/2002 | Glasheen et al. |
| 2003/0035491 A1 | 2/2003 | Walton et al. |
| 2005/0108281 A1 | 5/2005 | Kim et al. |
| 2005/0141630 A1 | 6/2005 | Catreaux et al. |
| 2005/0157810 A1 | 7/2005 | Raleigh et al. |
| 2005/0237920 A1 | 10/2005 | Howard et al. |
| 2005/0250544 A1 | 11/2005 | Grant et al. |
| 2005/0276317 A1 * | 12/2005 | Jeong et al. ................... 375/213 |
| 2006/0014554 A1 | 1/2006 | Gerlach |
| 2006/0056538 A1 | 3/2006 | Nam et al. |
| 2006/0093060 A1 | 5/2006 | Jung et al. |
| 2006/0114858 A1 | 6/2006 | Walton et al. |
| 2006/0153112 A1 | 7/2006 | Lim et al. |
| 2006/0203777 A1 | 9/2006 | Kim et al. |
| 2006/0233131 A1 | 10/2006 | Gore et al. |
| 2006/0276212 A1 | 12/2006 | Sampath et al. |
| 2007/0058746 A1 | 3/2007 | Gueguen |
| 2007/0076810 A1 | 4/2007 | Herrera et al. |
| 2007/0099578 A1 | 5/2007 | Adeney et al. |
| 2007/0149229 A1 | 6/2007 | Frederiksen et al. |
| 2007/0153731 A1 | 7/2007 | Fine |
| 2007/0160162 A1 | 7/2007 | Kim et al. |
| 2007/0165738 A1 | 7/2007 | Barriac et al. |
| 2007/0217540 A1 | 9/2007 | Onggosanusi et al. |
| 2007/0223422 A1 | 9/2007 | Kim et al. |
| 2007/0223423 A1 | 9/2007 | Kim et al. |
| 2007/0230373 A1 | 10/2007 | Li et al. |
| 2007/0248068 A1 | 10/2007 | Onggosanusi et al. |
| 2007/0253386 A1 | 11/2007 | Li et al. |
| 2007/0270170 A1 | 11/2007 | Yoon et al. |
| 2007/0274411 A1 * | 11/2007 | Lee et al. ...................... 375/267 |
| 2008/0013610 A1 | 1/2008 | Varadarajan et al. |
| 2008/0025336 A1 | 1/2008 | Cho et al. |
| 2008/0039067 A1 | 2/2008 | Jin et al. |
| 2008/0043702 A1 | 2/2008 | Moon et al. |
| 2008/0049709 A1 | 2/2008 | Pan et al. |
| 2008/0080364 A1 | 4/2008 | Barak et al. |
| 2008/0080632 A1 | 4/2008 | Kim et al. |
| 2008/0080634 A1 | 4/2008 | Kotecha et al. |
| 2008/0080635 A1 | 4/2008 | Hugl et al. |
| 2008/0080637 A1 | 4/2008 | Khan et al. |
| 2008/0095258 A1 | 4/2008 | She et al. |
| 2008/0101407 A1 | 5/2008 | Khan et al. |
| 2008/0108310 A1 | 5/2008 | Tong et al. |
| 2008/0112351 A1 | 5/2008 | Surineni et al. |
| 2008/0130778 A1 | 6/2008 | Xia et al. |
| 2008/0144522 A1 | 6/2008 | Chang et al. |
| 2008/0165875 A1 | 7/2008 | Mundarath et al. |
| 2008/0186212 A1 | 8/2008 | Clerckx et al. |
| 2008/0192852 A1 | 8/2008 | Kent et al. |
| 2008/0198776 A1 | 8/2008 | Seo |
| 2008/0232494 A1 | 9/2008 | Pan et al. |
| 2008/0232503 A1 | 9/2008 | Kim |
| 2008/0247364 A1 | 10/2008 | Kim et al. |
| 2008/0247475 A1 | 10/2008 | Kim et al. |
| 2008/0268855 A1 | 10/2008 | Hanuni et al. |
| 2008/0268887 A1 | 10/2008 | Jansen et al. |
| 2008/0285433 A1 | 11/2008 | Akita et al. |
| 2008/0292013 A1 | 11/2008 | Varadarajan et al. |
| 2008/0298452 A1 | 12/2008 | Sampath et al. |
| 2008/0298482 A1 | 12/2008 | Rensburg et al. |
| 2008/0318606 A1 | 12/2008 | Tsutsui et al. |
| 2009/0011761 A1 | 1/2009 | Han et al. |
| 2009/0016263 A1 | 1/2009 | Kishigami et al. |
| 2009/0046800 A1 | 2/2009 | Xu et al. |
| 2009/0098876 A1 | 4/2009 | Khan et al. |
| 2009/0110114 A1 | 4/2009 | Onggosanusi et al. |
| 2009/0122857 A1 | 5/2009 | Li et al. |
| 2009/0161605 A1 | 6/2009 | Shen et al. |
| 2009/0180561 A1 | 7/2009 | Kim et al. |
| 2009/0252332 A1 | 10/2009 | Chang et al. |
| 2009/0252333 A1 | 10/2009 | Chang et al. |
| 2009/0282310 A1 | 11/2009 | Seok et al. |
| 2009/0296844 A1 | 12/2009 | Ihm et al. |
| 2009/0304109 A1 | 12/2009 | Kotecha |
| 2010/0031117 A1 | 2/2010 | Lee et al. |
| 2010/0034308 A1 | 2/2010 | Kim et al. |
| 2010/0035627 A1 | 2/2010 | Hou et al. |
| 2010/0054354 A1 | 3/2010 | Tosato |
| 2010/0056170 A1 | 3/2010 | Lindoff et al. |
| 2010/0061477 A1 | 3/2010 | Lee et al. |
| 2010/0067512 A1 | 3/2010 | Nam et al. |
| 2010/0069106 A1 | 3/2010 | Swarts et al. |
| 2010/0074301 A1 | 3/2010 | Howard et al. |
| 2010/0103834 A1 | 4/2010 | Gorokhov et al. |
| 2010/0158151 A1 | 6/2010 | Krauss et al. |
| 2010/0172424 A1 | 7/2010 | Perets et al. |
| 2010/0172430 A1 | 7/2010 | Melzer et al. |
| 2010/0173639 A1 | 7/2010 | Li et al. |
| 2010/0215112 A1 | 8/2010 | Tsai et al. |
| 2010/0220800 A1 | 9/2010 | Erell et al. |
| 2010/0238984 A1 | 9/2010 | Sayana et al. |
| 2010/0254474 A1 | 10/2010 | Gomadam et al. |
| 2010/0260234 A1 | 10/2010 | Thomas et al. |
| 2010/0260243 A1 | 10/2010 | Ihm et al. |
| 2010/0267341 A1 | 10/2010 | Bergel et al. |
| 2010/0271968 A1 | 10/2010 | Liu et al. |
| 2010/0272014 A1 | 10/2010 | Orlik et al. |
| 2010/0272032 A1 | 10/2010 | Sayana et al. |
| 2010/0273514 A1 | 10/2010 | Koo et al. |
| 2010/0278278 A1 | 11/2010 | Lee et al. |
| 2010/0284484 A1 | 11/2010 | Jongren et al. |
| 2010/0290548 A1 | 11/2010 | Hoshino et al. |
| 2010/0296603 A1 * | 11/2010 | Lee et al. ....................... 375/295 |
| 2011/0019631 A1 | 1/2011 | Kotecha et al. |
| 2011/0026413 A1 | 2/2011 | Swarts et al. |
| 2011/0034175 A1 | 2/2011 | Fong et al. |
| 2011/0058621 A1 | 3/2011 | Clerckx et al. |
| 2011/0064156 A1 | 3/2011 | Kim et al. |
| 2011/0077038 A1 | 3/2011 | Montojo et al. |
| 2011/0080969 A1 | 4/2011 | Jongren et al. |
| 2011/0085610 A1 | 4/2011 | Zhuang et al. |
| 2011/0103534 A1 | 5/2011 | Axmon et al. |
| 2011/0110403 A1 | 5/2011 | Jongren |
| 2011/0164701 A1 | 7/2011 | Nikopourdeilami et al. |
| 2011/0170435 A1 | 7/2011 | Kim et al. |
| 2011/0170638 A1 | 7/2011 | Yuan et al. |
| 2011/0188393 A1 | 8/2011 | Mallik et al. |
| 2011/0194594 A1 | 8/2011 | Noh et al. |
| 2011/0194644 A1 | 8/2011 | Liu et al. |
| 2011/0205930 A1 | 8/2011 | Rahman et al. |
| 2011/0216846 A1 | 9/2011 | Lee et al. |
| 2011/0235608 A1 | 9/2011 | Koo et al. |
| 2011/0250919 A1 | 10/2011 | Barbieri et al. |
| 2011/0261775 A1 * | 10/2011 | Kim et al. ..................... 370/329 |
| 2011/0268204 A1 | 11/2011 | Choi et al. |
| 2011/0274188 A1 | 11/2011 | Sayana et al. |
| 2011/0306341 A1 | 12/2011 | Klein et al. |
| 2012/0002568 A1 | 1/2012 | Tiirola et al. |
| 2012/0020433 A1 | 1/2012 | Bhattad et al. |
| 2012/0033592 A1 | 2/2012 | Kim et al. |
| 2012/0033630 A1 * | 2/2012 | Chung et al. ................... 370/329 |
| 2012/0039369 A1 | 2/2012 | Choi et al. |
| 2012/0058735 A1 | 3/2012 | Vermani et al. |
| 2012/0063336 A1 | 3/2012 | Shany et al. |
| 2012/0069887 A1 | 3/2012 | Park et al. |
| 2012/0069917 A1 | 3/2012 | Liu et al. |
| 2012/0076028 A1 | 3/2012 | Ko et al. |
| 2012/0087425 A1 | 4/2012 | Gomadam et al. |
| 2012/0087435 A1 | 4/2012 | Gomadam et al. |
| 2012/0134434 A1 | 5/2012 | Chen et al. |
| 2012/0219042 A1 | 8/2012 | Onggosanusi et al. |
| 2012/0219083 A1 | 8/2012 | Tong et al. |
| 2012/0257664 A1 | 10/2012 | Yue et al. |
| 2012/0275376 A1 | 11/2012 | Sampath et al. |
| 2012/0275386 A1 | 11/2012 | Frenne et al. |
| 2012/0281620 A1 | 11/2012 | Sampath et al. |
| 2013/0028068 A1 | 1/2013 | Park et al. |
| 2013/0028344 A1 | 1/2013 | Chen et al. |
| 2013/0039284 A1 | 2/2013 | Marinier et al. |

(56) References Cited

U.S. PATENT DOCUMENTS

| | | | |
|---|---|---|---|
| 2013/0051256 | A1 | 2/2013 | Ong et al. |
| 2013/0107916 | A1 | 5/2013 | Liu et al. |
| 2013/0176991 | A1 | 7/2013 | Yi |
| 2013/0182786 | A1 | 7/2013 | Frenne et al. |

FOREIGN PATENT DOCUMENTS

| | | |
|---|---|---|
| JP | 2008054125 A | 3/2008 |
| JP | 2008118411 A | 5/2008 |
| JP | 2008147792 A | 6/2008 |
| WO | 2005117283 A2 | 12/2005 |
| WO | 2007133564 A3 | 11/2007 |
| WO | 2008009157 A1 | 1/2008 |
| WO | 2008133582 A2 | 11/2008 |
| WO | 2009116471 A1 | 9/2009 |
| WO | 2010013950 A2 | 2/2010 |
| WO | 2011147692 A1 | 12/2011 |

OTHER PUBLICATIONS

U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSA-RAN Working Group 1 Meeting #55, Prague, Czech Republic, Nov. 10-14, 2008.
NTT DOCOMO, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, 17th-21st Nov. 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.8.0 (Dec. 2009), Sophia Antipolis, France.
Samsung, "Discussion on Enhanced DL Beamforming", 3GPP TSG RAN WG1 Meeting #56bis, Seoul, Korea, Mar. 23-27, 2009.

Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 7Tx DL SU-MIMO for LTE-1", TSG-RAN WG1 #59, Jeju, Korea, Nov 9-13, 2009.
Marvell Semiconductor, "Precoding Options for 7Tx Antennas in LTE-A DL", 3GPP TSG RAN WG1 Meeting #55bis, Ljubljana, Slovenia, Jan. 12-16, 2009.
U.S. Appl. No. 61/303,217 "Tree-Structure for Codebook Adaptation", filed Feb. 10, 2010.
U.S. Appl. No. 61/318,500 "Scoring Hypotheses in LTE Cell Search" filed Mar. 29, 2010.
U.S. Appl. No. 61/321,386 "Extending Rel 8 Feedback by Successive Codebook Refinement" filed Apr. 6, 2010.
U.S. Appl. No. 61/329,798 "Tree-Structure for Codebook Adaptation", filed Apr. 30, 2010.
U.S. Appl. No. 61/294,737 "Precoding Codebooks for 8TX XPOL Antennas" filed Mar. 13, 2010.
U.S. Appl. No. 12/965,878 "MIMO Feedback Schemes for Cross-Polarized Antennas" filed Dec. 12, 2010.
Samsung, "Codebook Design for 8 Tx Transmission in LTE-A", 3GPP TSG RAN WG1 Meeting #56, Athens, Greece, Feb. 9-13, 2009.
U.S. Appl. No. 12/902,168 "Efficient Estimation of Channel State Information (CSI) Feedback" filed Oct. 12, 2010.
U.S. Appl. No. 12/838,509 "Asymmetrical Feedback for Coordinated Transmission Systems" filed Jul. 19, 2010.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Marvell, "Codebook Adaptation for ULA Antenna", 3GPP TSG RAN WG1 Meeting #60, San Francisco, USA, Feb. 22-22, 2010.
Marvell, "Successive Codebook Refinement: Further details and evaluation", 3GPP TSG-RAN WG1 #60bis, Beijing, Apr. 12-16, 2010.
Marvell Semiconductor, "Feedback Methods for exploiting Channel Correlation in LTE-A DL", Feedback Methods for exploiting Channel Correlation in LTE-A DL, Los Angeles, United States, Jun. 29-Jul. 3, 2009.
Marvell Semiconductor, "Spatial Correlation based transmission schemes for LTE-A DL", 3GPP TSG RAN WG1 meeting #58, Shenzhen, China, Aug. 24-28, 2009.
Samsung, Comparisons and performance evaluation of differential feedback proposals for Rel 8 PMI enhancements, 3GPP TSG RAN WG1 Meeting #59bis, Valencia, Spain, Jan. 18-22, 2010.
U.S. Appl. No. 13/023,555, filed Feb. 9, 2011.
U.S. Appl. No. 13/052,075, filed Mar. 20, 2011.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
International Application PCT/IB2009/052987 Search Report dated Jan. 27, 2010.
Rapporteur (NTT DOCOMO), "Text Proposal for RAN1 TR on LTE Advanced", 3GPP TSG RAN WG1 Meeting #53bis, Warsaw, Poland, Jun. 30-Jul. 4, 2008.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
U.S. Appl. No. 12/983,898, filed Jan. 4, 2011.

(56) References Cited

OTHER PUBLICATIONS

Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009.
U.S. Appl. No. 12/723,647 Official Action dated Feb. 6, 2012.
U.S. Appl. No. 12/723,647 Official Action dated Apr. 27, 2012.
U.S. Appl. No. 12/652,044 Official Action dated Feb. 7, 2012.
Alcatel-Lucent et al., "Way Forward on Enhancement for REL.10 DL MIMO", 3GPP TSG RAN # 62 Meeting, Madrid, Spain, Aug. 23-27, 2010.
Alcatel-Lucent, "Further Analysis of Companion Feedback Performance and Feedback Signaling Overhead Reduction", 3GPP TSG RAN # 62 Meeting, Madrid, Spain, Aug. 23-27, 2010.
Alcatel-Lucent et al., "Way Forward on CQI/PMI Reporting Enhancement on PUSCH 3-1 for 2,4 and 8TX", 3GPP TSG RAN # 62BIS, Xian, China, Oct. 11-15, 2010.
Marvell, "CQI Enhancement for 4Tx", 3GPP TSG RAN # 62BIS, Xian,China, Oct. 11-15, 2010.
NEC Group, "Enhancing MU-MIMO CQI", 3GPP TSG RAN # 62BIS, Xian, China, Oct. 11-15, 2010.
LG Electronics, "Further Discussion on CQI/PMI Enhancement", 3GPP TSG RAN # 62BIS, Xian, China, Oct. 11-15, 2010.
Samsung, "Coordinated Multi-Point Operation for LTE", Istanbul, Turkey, Dec 7-10, 2010.
Alcatel-Lucent et al., "Way Forward on CSI Feedback for Re1.10 DL MIMO", 3GPP TSG RAN # 62 Meeting, Madrid, Spain, Aug. 23-27, 2010.
Marvell, "Two-Component PMI Codebook for 8TX", 3GPP TSG RAN # 62 Meeting, Madrid, Spain, Aug. 23-27, 2010.
Marvell, "Details of PUCCH 1-1 for 8Tx", 3GPP TSG RAN # 63, Jacksonville, USA, Nov. 15-19, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
Zte, "Initial CoMP Evaluation for Homogeneous Network with High Tx Power RRHs", 3GPP TSG RAN # 64, Taipei, Taiwan, Feb. 21-25, 2011.
U.S. Appl. No. 13/346,737, filed Jan. 10, 2012.
U.S. Appl. No. 13/433,293, filed Mar. 29, 2012.
Japanese Patent Application # 2011-544111 Office Action dated Mar. 12, 2013.
U.S. Appl. No. 13/252,218 Office Action dated Apr. 11, 2013.
ZTE, "Link Analysis of 4Tx Codebook Design for DL SU-MIMO", 3GPP TSG-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/253,078 Office Action dated May 23, 2013.
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
Ericsson, "Design and Evaluation of Precoder Codebooks for CSI Feedback", 3GPP TSG RAN WG1 61bis, Dresden, Germany, Jun. 28-Jul. 2, 2010.
Rapporteur, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Spain, Aug. 23-27, 2010.
Alcatel-Lucent et al., "Way Forward on 8Tx Codebook for Rel.10 DL MIMO", 3GPP TSG RAN WG1 62, Madrid, Spain, Aug. 23-27, 2010.
U.S. Appl. No. 61/390,423, filed Oct. 6, 2010.
U.S. Appl. No. 61/432,980, filed Jan. 14, 2011.
U.S. Appl. No. 61/390,511, filed Oct. 6, 2010.
U.S. Appl. No. 12/477,152 Official Action dated Jun. 26, 2012.
U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subs pace-Based Channel Quantization for Distributed Cooperative Antenna Systems with Temporarily Correlated Channels", EURASIP Journal on Advances in Signal Processing, vol. 2008, Nov. 23, 2007.
NTT Docomo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
JP Patent Application # 2011-544111 Official Action dated Nov. 6, 2012.
Nortel, "On the discussions of carrier aggregations", 3GPP TSG-RAN Working Group 1 Meeting #55, Prague, Czech Republic, Nov. 10-14, 2008.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
QUALCOMM Europe, "Link Analysis for 4×2 and 4×4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study

(56) References Cited

OTHER PUBLICATIONS for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009.
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16—2001, IEEE Computer Society and IEE Microwave Theory and Techniques Society, USA, Oct. 1, 2004.
NTT DOCOMO et al., "Prioritized Deployment Scenarios for LTE-Advanced Studies", 3GPP TSG RAN WG4 Meeting #50, Athens, Greece, Feb. 9-13, 2009.
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
QUALCOMM Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
3rd Generation Partnership Project; "Technical Specification Group Radio Access Network; Evolved Universal Terrestrial Radio Access (E-UTRA)"; Physical Layer Procedures (Release 8), 3GPP TS 36.213 V8.6.0 (Mar. 2009), Sophia Antipolis, France.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
Bergel et al., U.S. Appl. No. 61/111,475 "Channel Feedback Schemes for LTE Advanced" filed Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009.
Nokia Siemens Networks, "PUSCH Power Control for LTE-Advanced", 3GPP TSG RAN WG1 Meeting # 57bis, Los Angeles, USA, Jun. 29-Jul. 3, 2009.
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008.
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008.
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009.
QUALCOMM Europe, Notion of Anchor Carrier in LTE-A, 3GPP TSG RAN WG1 Meeting #55-bis, Ljubljana, Slovenia, Jan. 12-16, 2009.
Samsung, "UL Transmission Power Control in LTE-A", 3GPP TSG RAN WG1 Meeting #56bis, Seoul, Korea, Mar. 23-27, 2009.
U.S. Appl. No. 12/902,168 Office Action dated Aug. 5, 2013.
U.S. Appl. No. 12/983,898 Office Action dated Sep. 12, 2013.
U.S. Appl. No. 13/052,075 Office Action dated Jul. 15, 2013.
U.S. Appl. No. 13/766,790 Office Action dated Jul. 22, 2013.
International Application PCT/IB2013/052963 Search Report dated Sep. 27, 2013.
JP Patent Application # 2011-551560 Office Action dated Oct. 29, 2013.
JP Patent Application # 2012-506601 Office Action dated Oct. 22, 2013.
U.S. Appl. No. 12/965,878 Office Action dated Oct. 24, 2013.
U.S. Appl. No. 13/052,075 Notice of Allowance dated Nov. 8, 2013.
U.S. Appl. No. 12/965,878 Notice of Allowance dated Feb. 10, 2014.
U.S. Appl. No. 13/543,835 Office Action dated Nov. 22, 2013.
U.S. Appl. No. 13/669,476 Office Action dated Mar. 31, 2014.
U.S. Appl. No. 14/179,593 Office Action dated Apr. 9, 2014.
NTT DOCOMO, 3GPP TSG RAN WG1, "Views on Single-Cell CSI Feedback Enhancement for DL MU-MIMO in LTE-Advanced", Meeting #58bis, R1-094241, pp. 1-6, Oct. 12-16, 2009.
JP Application # 2012537460 Office Action dated Jan. 21, 2014.
NTT DOCOMO, 3GPP TSG RAN WG1, "Views on Scalable CSI Feedback for DL CoMP in LTE-Advanced" , Meeting #58bis, R1-094243, pp. 1-5, Oct. 12-16, 2009.
U.S. Appl. No. 13/669,477 Official Action dated Apr. 14, 2014.

\* cited by examiner

TRANSMISSION-MODE-AWARE RATE MATCHING IN MIMO SIGNAL GENERATION

CROSS-REFERENCE TO RELATED APPLICATIONS

This application claims the benefit of U.S. Provisional Patent Application 61/252,991, filed Oct. 19, 2009, whose disclosure is incorporated herein by reference.

FIELD OF THE DISCLOSURE

The present disclosure relates generally to communication systems, and particularly to Multiple-Input Multiple-Output (MIMO) transmission.

BACKGROUND

Some communication systems transmit data from a transmitter to a receiver over multiple communication channels, using multiple transmit antennas and multiple receive antennas. Multiple-channel transmission is used, for example, in spatial multiplexing schemes that achieve high throughput and in spatial diversity schemes that achieve high resilience against channel fading and multipath. These schemes are often referred to collectively as Multiple-Input Multiple-Output (MIMO) schemes.

MIMO schemes are used, for example, in Evolved Universal Terrestrial Radio Access (E-UTRA) systems, also referred to as Long Term Evolution (LTE) systems. The Third Generation Partnership Project (3GPP) E-UTRA standards specify MIMO schemes for use by E-UTRA User Equipment (UE) and base stations (eNodeB). These schemes are described, for example, in 3GPP Technical Specification 36.211, entitled "Technical Specification Group Radio Access Network; Evolved Universal Terrestrial Radio Access (E-UTRA); Physical Channels and Modulation (Release 8)," (3GPP TS 36.211), version 8.9.0, December, 2009; and in 3GPP Technical Specification 36.212, entitled "Technical Specification Group Radio Access Network; Evolved Universal Terrestrial Radio Access (E-UTRA); Multiplexing and Channel Coding (Release 8)," (3GPP TS 36.212), version 8.8.0, December 2009, which are incorporated herein by reference. In particular, section 5.1.4 of the TS 36.212 specification describes rate matching for LTE transport channels.

The 3GPP is currently in the process of specifying an extension of the E-UTRA specification, which is referred to as LTE-Advanced (LTE-A). The evolving LTE specifications contemplate MIMO transmission using up to eight transmit antenna ports. LTE-A schemes are described, for example, in 3GPP Technical Report TR 36.814, entitled "Technical Specification Group Radio Access Network; Evolved Universal Terrestrial Radio Access (E-UTRA); Further advancements for E-UTRA physical layer aspects (Release 9)," (3GPP TR 814), version 9.0.0, March, 2010, which is incorporated herein by reference. Chapter 7 of this technical report describes downlink MIMO transmission schemes for use in LTE-A systems.

The description above is presented as a general overview of related art in this field and should not be construed as an admission that any of the information it contains constitutes prior art against the present patent application.

SUMMARY

An embodiment that is described herein provides a method in a Multiple-Input Multiple-Output (MIMO) transmitter. The method includes selecting a transmission mode from a group of modes including a spatial multiplexing mode and a transmit diversity mode. A rate matching parameter is set depending on at least the selected transmission mode. Data for transmission is formatted in one or more transport blocks, each transport block including multiple code blocks having respective lengths, in symbols, that are respective integer multiples of the rate matching parameter. The code blocks of a given transport block are mapped onto time-frequency resource elements in accordance with the selected transmission mode, each resource element corresponding to a respective frequency range that is allocated for a given transmission over a specified time interval, such that each resource element contains data originating from only a respective one of the code blocks of the given transport block. The code blocks of the given transport block are transmitted over the time-frequency resource elements to a receiver.

In some embodiments, mapping the code blocks onto the resource elements includes mapping the code blocks onto a number of spatial layers, and mapping the spatial layers onto the resource elements. In an embodiment, setting the rate matching parameter includes choosing the rate matching parameter depending on the number of the spatial layers. In another embodiment, setting the rate matching parameter includes fixing the rate matching parameter to be equal to the number of the spatial layers when the number of the spatial layers is between one and three. In yet another embodiment, when the number of the spatial layers is four, setting the rate matching parameter includes fixing the rate matching parameter to be two when the selected transmission mode is the transmit diversity mode, and fixing the rate matching parameter to be four when the selected transmission mode is the spatial multiplexing mode.

In a disclosed embodiment, setting the rate matching parameter includes indicating the rate matching parameter to the receiver by signaling at least the selected transmission mode from the transmitter to the receiver. In another embodiment, setting the rate matching parameter includes reporting the rate matching parameter from the transmitter to the receiver. In some embodiments, transmitting the MIMO signal includes transmitting the signal in accordance with a Long Term Evolution Advanced (LTE-A) specification.

There is additionally provided, in accordance with an embodiment that is described herein, a MIMO transmitter including a controller, a rate matching unit, a mapping unit and transmission circuitry. The controller is configured to select a transmission mode from a group of modes including a spatial multiplexing mode and a transmit diversity mode. The rate matching unit is configured to set a rate matching parameter depending on at least the selected transmission mode, and to format data for transmission in one or more transport blocks, each transport block including multiple code blocks having respective lengths, in symbols, that are respective integer multiples of the rate matching parameter. The mapping unit is configured to map the code blocks of a given transport block onto time-frequency resource elements in accordance with the selected transmission mode, each resource element corresponding to a respective frequency range that is allocated for a given transmission over a specified time interval, such that each resource element contains data originating from only a respective one of the code blocks of the given transport block. The transmission circuitry is configured to transmit the code blocks of the given transport block in a MIMO signal over the time-frequency resource elements to a receiver.

There is further provided, in accordance with an embodiment that is described herein, a system including a MIMO transmitter and a receiver. The transmitter is configured to select a transmission mode from a group of modes including a spatial multiplexing mode and a transmit diversity mode, to set a rate matching parameter depending on at least the selected transmission mode, to format data for transmission in one or more transport blocks, each transport block including multiple code blocks having respective lengths, in symbols, that are respective integer multiples of the rate matching parameter, to map the code blocks of a given transport block onto time-frequency resource elements in accordance with the selected transmission mode, each resource element corresponding to a respective frequency range that is allocated for a given transmission over a specified time interval, such that each resource element contains data originating from only a respective one of the code blocks of the given transport block, and to transmit the code blocks of the given transport block in a MIMO signal over the time-frequency resource elements. The receiver is configured to receive the MIMO signal from the transmitter and to decode the code blocks based on the rate matching parameter. In some embodiments, the transmitter is configured to transmit to the receiver signaling that is indicative of the rate matching parameter, and the receiver is configured to determine the rate matching parameter based on the signaling.

The present disclosure will be more fully understood from the following detailed description of the embodiments thereof, taken together with the drawings in which:

DETAILED DESCRIPTION OF EMBODIMENTS

Figure 1:
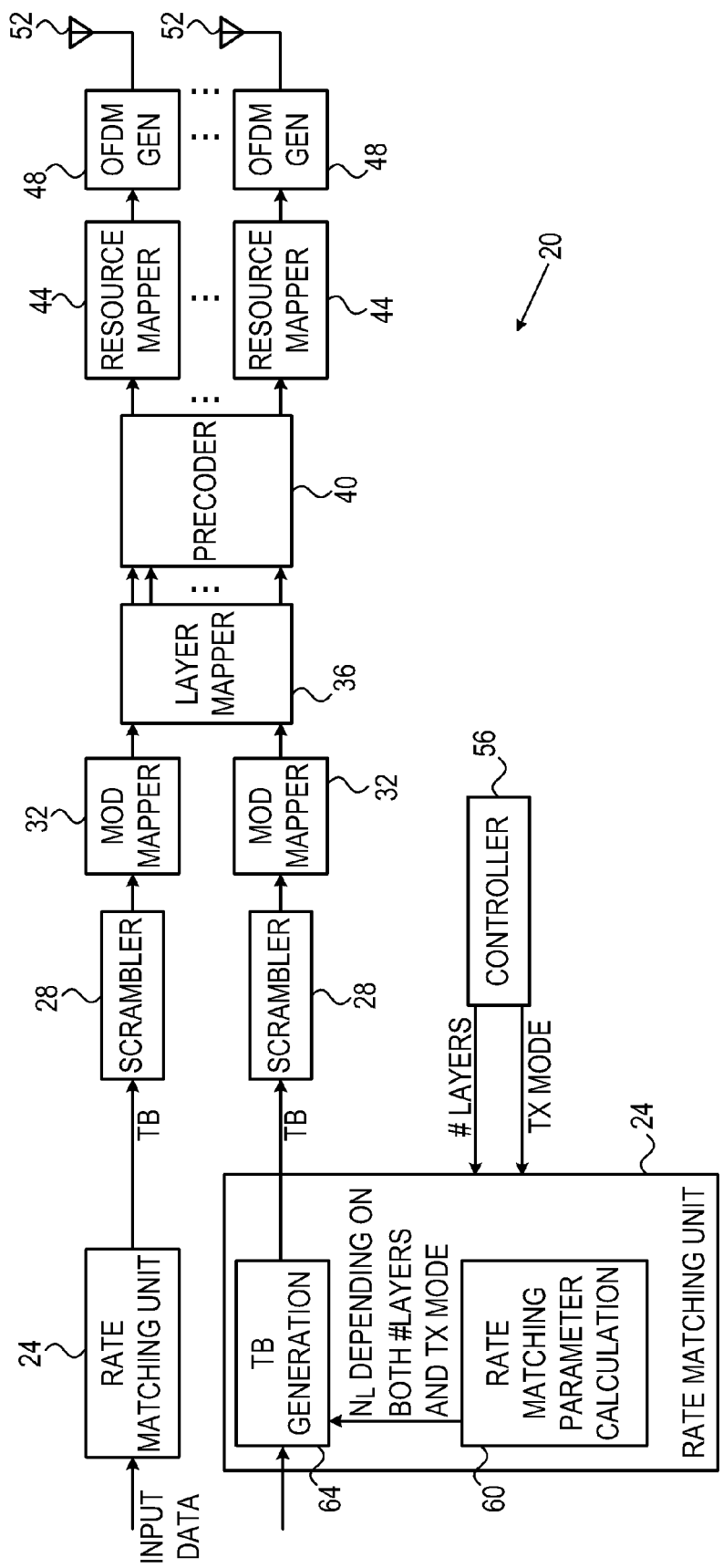
FIG. 1 is a block diagram that schematically illustrates a MIMO transmitter, in accordance with an embodiment that is described herein.

In some known MIMO schemes, for example, a transmitter generates one or more Transport Blocks (TBs), such that each TB is divided into multiple Code Blocks (CBs). The transmitter then converts the bits of each TB into modulated symbols, and maps the modulated symbols onto spatial layers, i.e., onto signals that carry the symbols and are to be transmitted to a receiver over different MIMO transmission channels. The transmitter applies a precoding operation to map each spatial layer onto a respective set of transmit antenna ports. The transmitter allocates a set of time-frequency bins, referred to as Resource Elements (REs) in E-UTRA terminology, for transmission to a certain receiver.

The transmitter may transmit MIMO signals using various MIMO transmission modes, such as spatial multiplexing and transmit diversity. Transmission modes used in E-UTRA systems are described, for example, in section 7.1 of 3GPP Technical Specification 36.213, entitled "Technical Specification Group Radio Access Network; Evolved Universal Terrestrial Radio Access (E-UTRA); Physical Layer Procedures (Release 8)," (3GPP TS 36.213), version 8.6.0, March, 2009, which is incorporated herein by reference. A transmission process of this sort, as performed in the downlink of an E-UTRA eNodeB, is described in detail in chapter 6 of the 3GPP TS 36.211 specification, cited above. A similar process, as contemplated for use in LTE-A eNodeB, is described in chapter 7 of the 3GPP TR 36.814 technical report, cited above.

In embodiments of the present disclosure, a transmitter is configured to ensure that bits from different Code Blocks (CBs) in a given Transport Block (TB) are not mapped onto the same Resource Element (RE). In other words, each RE is to contain symbols that originate from only a single CB in a given TB. A scheme of this sort, for example, enables the receiver to process each RE independently. Embodiments that are described herein provide methods and systems for producing CBs and TBs that meet the above-described condition.

In some embodiments, a rate matching unit in the transmitter accepts input data for transmission in a given TB, and produces the CBs that make-up this TB. The TB in question is to be mapped onto a certain number of spatial layers and transmitted using a certain transmission mode (spatial multiplexing or transmit diversity). The rate matching unit selects a rate matching parameter, denoted $N_L$, which depends on the number of spatial layers and on the transmission mode of the transmitter.

In an embodiment, the rate matching unit then formats the input data in CBs, such that the length of each CB (in symbols) is an integer multiple of the rate matching parameter $N_L$. The TB that is produced in this manner is then mapped onto the designated number of spatial layers and transmitted using the designated transmission mode.

The signal generation techniques described herein comply with the condition that each RE contains symbols originating from only a single CB in a given TB. Moreover, the CBs that are produced using these techniques have a relatively small variance in length within each TB. These features simplify processing both in the transmitter and in the receiver, and therefore reduce system cost and complexity. The disclosed techniques can also improve communication link performance in comparison with conventional signal generation schemes, since they enable highly accurate link adaptation: Smaller variance in the CB lengths enables the transmitter to better match the code rates (which in turn depend on the CB lengths) to the channel quality.

The methods and systems described herein are particularly useful in MIMO systems having a large number of transmit antenna ports, such as in LTE-A systems. A specific signal generation scheme for LTE-A systems, which is backward-compatible to legacy LTE systems, is described. Generally, however, the disclosed techniques can be used in various other MIMO applications.

FIG. 1 is a block diagram that schematically illustrates a MIMO transmitter 20, in accordance with an embodiment that is described herein. The description that follows refers to a transmitter of an LTE-Advanced (LTE-A) base station (eNodeB), although the methods and systems described herein can be used in transmitters operating in accordance with any other suitable communication standard or protocol, such as LTE, IEEE 802.16 (also referred to as WiMAX), for example. Although the description that follows refers mainly to downlink transmission from the eNodeB to the UE, the disclosed methods and systems may be applicable to uplink transmission, as well.

Transmitter 20 comprises one or more modulation chains, each comprising a rate matching unit 24, a scrambler 28 and a modulation mapper 32. Input data for transmission is encoded with an Error Correction Code (ECC) using a respective ECC encoder (not shown in the figure) to produce code words. In an embodiment, the number of code words can be one or more and may depend on the number of input bits. Each code word is rate-matched by puncturing in a respective rate matching unit 24, resulting in a Code Block (CB). Consequently, within a given Transmission Time Interval (TTI), each rate matching unit 24 produces a Transport Block (TB) comprising multiple CBs, using methods that are described in detail further below.

The TBs produced by each rate matching unit 24 are scrambled by a respective scrambler 28, and then modulated by a respective modulation mapper 32. Each modulation mapper produces a stream of complex-valued modulated symbols. Any suitable modulation scheme, such as Quadrature Phase Shift Keying (QPSK) or Quadrature Amplitude Modulation (QAM), can be used.

A layer mapper 36 maps the modulated symbol streams produced by modulation mappers 32 onto one or more spatial layers. In an embodiment, the layer mapper maps one or two TBs onto one or more spatial layers. (For a given set of time and frequency resources allocated to a certain communication channel, the multiple transmit and receive antennas add a "spatial" dimension to these resources. One of the possibilities to exploit the additional spatial dimension is by increasing the number of independent modulated symbols transmitted per time-frequency resource. The factor of increase, relative to the case of a single transmit antenna and a single receive antenna, is defined as the number of spatial layers.) Each spatial layer comprises a stream of complex values, which are to be subsequently transmitted over the MIMO communication channel.

The mapped spatial layers are provided to a precoder 40. Precoder 40 maps the spatial layers onto transmit antenna ports 52 of the transmitter according to a certain precoding scheme. (Note that a given antenna port may not necessarily correspond to a single physical antenna, but may correspond to a "virtual antenna" whose transmitted signal is generated—in a manner that the receiver need not necessarily be aware of—as a superposition (a weighted sum) of the signals stemming from a number of physical antennas. The number of transmit antenna ports may be larger than the number of layers.) In the present example, transmitter 20 comprises eight transmit antenna ports, although any other suitable number of transmit antenna ports can also be used.

Resource mappers 44 allocate Resource Elements (REs) to the respective transmit antenna ports. Each RE corresponds to a respective frequency range (a.k.a. bin) that is allocated for a given transmission over a specified time interval. The outputs of mappers 44 are processed by respective Orthogonal Frequency Division Multiplexing (OFDM) generators 48, which produce OFDM signals that are transmitted via transmit antenna ports 52 toward the receiver.

Transmitter 20 comprises a controller 56, which configures and controls the different transmitter elements. In particular, controller 56 assigns the desired number of spatial layers, and the desired transmission mode (spatial multiplexing or transmit diversity) to be used in a given transmission. Processor 56 provides this information to rate matching units 24 for use in producing the CBs and TBs.

In an embodiment, for a given modulation chain, rate matching unit 24 formats the ECC-encoded input data in a TB comprising multiple CBs. The number of bits may differ from one CB to another in a given TB. Nevertheless, in an embodiment, the length of each CB (measured in terms of modulated symbols) is set to an integer multiple of a certain rate matching parameter $N_L$, which depends on the number of spatial layers and the transmission mode.

In an example embodiment, rate matching unit 24 comprises a rate matching parameter calculation module 60, which selects the value of $N_L$ depending on the number of spatial layers and the transmission mode that are indicated by controller 56. A TB generation module 64 formats the encoded input data in CBs, in accordance with the rate matching parameter selected by module 60. TB generation module 64 outputs the resulting TB to the respective scrambler 28. In FIG. 1, this example internal structure is shown for only one of the rate matching units, for the sake of clarity and to avoid obfuscating the teachings of the present disclosure. In an embodiment, the other rate matching unit 24 has a similar structure.

The transmitter configuration shown in FIG. 1 is a simplified example configuration, which is depicted solely for the sake of conceptual clarity. In alternative embodiments, any other suitable transmitter configuration can also be used. In some embodiments, scramblers 28, modulation mappers 32, layer mapper 36, precoder 40 and resource mapper 44 are regarded herein collectively as a mapping unit, which maps the CBs generated by rate matching unit 24 onto REs in accordance with the selected MIMO transmission mode such that any given RE has symbols originating from a single CB of a given TB. The functions of the mapping unit elements can be partitioned in any other suitable manner.

The different components of transmitter 20, including, for example, modules 60 and 64 of unit 24 and controller 56, may be implemented using hardware, such as using one or more Application-Specific Integrated Circuits (ASICs) and/or Field-Programmable Gate Arrays (FPGAs). Alternatively, some transmitter components may be implemented using software executing on a hardware device, or using a combination of hardware and software elements. In some embodiments, controller 56 comprises a programmable processor, which is programmed in software to carry out the functions described herein, although it too may be implemented in hardware. The software may be downloaded to the processor in electronic form, over a network, for example, or it may, alternatively or additionally, be provided and/or stored on tangible media, such as magnetic, optical, or electronic memory. In some embodiments, some or all of the elements of transmitter 20 may be fabricated in a chip-set. Transmitter elements that are not mandatory for explanation of the disclosed techniques, such as various Radio Frequency (RF) elements, have been omitted from FIG. 1 for the sake of clarity.

In some embodiments, rate matching unit 24 sets the length of each CB such that (after subsequent layer mapping, precoding and resource mapping) bits from different CBs in a given TB will not be mapped to the same RE. In other words, unit 24 is configured so that each RE has bits originating from a single CB of the given TB. Unit 24 achieves this goal by setting the length of each CB (in modulated symbols) to be an integer multiple of a rate matching parameter $N_L$, which depends on the number of spatial layers and on the transmission mode.

In an embodiment, module 60 in rate matching unit 24 selects $N_L$ in accordance with the following table:

TABLE 1

Example $N_L$ selection scheme

| # of spatial layers | Transmission mode | Selected $N_L$ |
|---|---|---|
| 1 | Any | 1 |
| 2 | Any | 2 |
| 3 | Any | 3 |
| 4 | Transmit diversity | 2 |
| 4 | Spatial multiplexing | 4 |

The example of Table 1 refers to an LTE-A eNodeB with eights transmit antenna ports, in which each TB is mapped onto up to four spatial layers. As can be seen in the table, the selected value of $N_L$ in the case of four spatial layers differs depending on the applicable transmission mode ($N_L$=2 for transmit diversity, $N_L$=4 for spatial multiplexing). The selection scheme seen in table 1 is backward-compatible with legacy LTE systems. The selection scheme of Table 1 is given purely by way of example. In alternative embodiments, module 60 may use any other suitable scheme for selecting $N_L$ depending on the number of spatial layers and the transmission mode.

In some embodiments, rate matching unit 24 sets the CB lengths as follows: Let G denote the total number of bits to be transmitted in a given TB. Let C denote the number of CBs in the TB. Let E denote the number of bits to be transmitted in the $r^{th}$ CB in the TB, $1 \leq r \leq C$, as produced at the output of rate matching unit 24. (E may differ from one CB to another, i.e., it may depend on r.) Let $Q_m$ denote on the modulation order (number of bits per symbol) of the modulation scheme used for modulating the MIMO signal. In the present example, $Q_m$=2 for QPSK, $Q_m$=4 for sixteen-symbol QAM (16-QAM) and $Q_m$=6 for sixty-four-symbol QAM (64-QAM).

In an embodiment, module 64 in rate matching unit 24 sets E, the number of bits in the $r^{th}$ CB, to be:

$$E = N_L \cdot Q_m \cdot \lfloor G'/C \rfloor \text{ for } r \leq C - \gamma - 1$$

$$E = N_L \cdot Q_m \cdot \lceil G'/C \rceil \text{ otherwise} \qquad \text{Equation 1:}$$

wherein $G'=G/(N_L \cdot Q_m)$, and $\gamma = G' \bmod C$. (For $r \leq C - \gamma - 1$, the term G'/C is rounded down, while for other values of r the term G'/C is rounded up.) As can be seen in Equation 1, $E/Q_m$ is an integer multiple of $N_L$ for any r (i.e., the length of any CB in modulated symbols is an integer multiple of the rate matching parameter). In alternative embodiments, module 64 may set the length of each CB in any other suitable manner, as long as the length of each CB (in modulated symbols) is an integer multiple of $N_L$.

Figure 2:
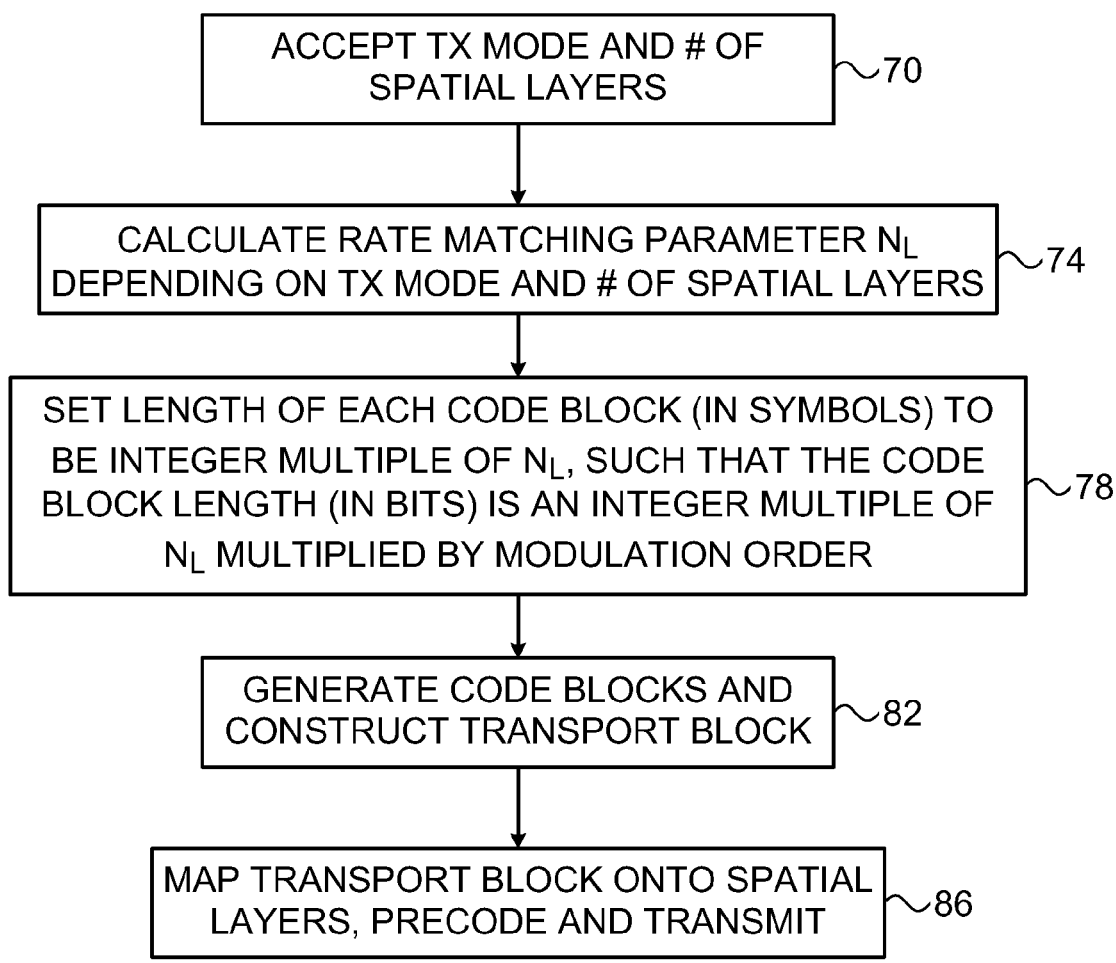
FIG. 2 is a flow chart that schematically illustrates a method for MIMO transmission, in accordance with an embodiment that is described herein.

FIG. 2 is a flow chart that schematically illustrates a method for MIMO transmission, in accordance with an embodiment that is described herein. The method begins with rate matching unit 24 accepting from controller 56 a designated number of spatial layers and a designated transmission mode, at an input operation 70.

Module 60 in unit 24 selects the value of rate matching parameter $N_L$ depending on the designated number of spatial layers and transmission mode, at a parameter selection operation 74. Module 64 in unit 24 sets the length of each CB (in symbols) to be an integer multiple of the selected $N_L$, at a length setting operation 78. In an example embodiment, module 64 sets the length of each CB (in bits) to be an integer multiple of $N_L \cdot Q_m$ in accordance with Equation 1 above. Module 64 generates the CBs of the TB, at a CB generation operation 82. The resulting TB is provided to scrambler 28.

Transmitter 20 processes and transmits the TB, at a transmission operation 86. In an embodiment, scrambler 28 scrambles the bits of the TB, modulation mapper 32 modulates the scrambled bits, layer mapper 36 maps the modulated symbols onto the designated number of spatial streams, precoder 40 precodes the spatial streams, resource mappers 44 map the precoded spatial streams onto REs, and OFDM generators 48 produce appropriate OFDM signals. The OFDM signals are then transmitted via transmit antenna ports 52. In an embodiment, the properly-sized CBs are mapped such that any RE has bits originating from only a single CB in a given TB.

In some embodiments, transmitter 20 signals the selected value of $N_L$ to the receiver, in order to enable the receiver to determine the lengths of the different CBs and successfully decode the TB. In some embodiments, the signaling is explicit, i.e., the transmitter notifies the receiver of the selected value of $N_L$. In alternative embodiments, the signaling of $N_L$ is implicit. In LTE systems, for example, the eNodeB notifies the UE of the transmission mode and the number of spatial layers. In an embodiment, the UE derives the value of $N_L$ from these signals parameters.

Although the embodiments described herein mainly address CB and TB generation in LTE-A systems, the methods and systems described herein can also be used in other applications, such as in WiMAX systems operating in accordance with IEEE 802.16 specifications.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
   in a Multiple-Input Multiple-Output (MIMO) transmitter, selecting a transmission mode;
   setting a rate matching parameter for a given number of spatial layers to a first value when the selected transmission mode is a spatial multiplexing mode, and setting the rate matching parameter for the given number of the spatial layers to a second value, different from the first value, when the selected transmission mode is a transmit diversity mode;
   formatting data for transmission in one or more transport blocks, each transport block comprising multiple code blocks having respective lengths, in symbols, that are respective integer multiples of the rate matching parameter;
   mapping the code blocks of a given transport block onto the given number of the spatial layers and onto time-frequency resource elements in accordance with the selected transmission mode, each resource element corresponding to a respective frequency range that is allocated for a given transmission over a specified time interval, such that each resource element contains data originating from only a respective one of the code blocks of the given transport block; and
   transmitting the code blocks of the given transport block in a MIMO signal over the time-frequency resource elements to a receiver.

2. The method according to claim 1, wherein mapping the code blocks onto the resource elements comprises mapping the code blocks onto the given number of the spatial layers, and mapping the spatial layers onto the resource elements.

3. The method according to claim 2, wherein setting the rate matching parameter comprises choosing the rate matching parameter depending on the given number of the spatial layers.

4. The method according to claim 2, wherein setting the rate matching parameter comprises fixing the rate matching parameter to be equal to the given number of the spatial layers when the given number of the spatial layers is between one and three.

5. The method according to claim 2, wherein, when the given number of the spatial layers is four, setting the rate matching parameter comprises fixing the rate matching parameter to be two when the selected transmission mode is the transmit diversity mode, and fixing the rate matching parameter to be four when the selected transmission mode is the spatial multiplexing mode.

6. The method according to claim 1, wherein setting the rate matching parameter comprises indicating the rate matching parameter to the receiver by signaling at least the selected transmission mode from the transmitter to the receiver.

7. The method according to claim 1, wherein setting the rate matching parameter comprises reporting the rate matching parameter from the transmitter to the receiver.

8. The method according to claim 1, wherein transmitting the MIMO signal comprises transmitting the signal in accordance with a Long Term Evolution Advanced (LTE-A) specification.

9. A Multiple-Input Multiple-Output (MIMO) transmitter, comprising:
   a controller, which is configured to select a transmission mode;
   a rate matching unit, which is configured to set a rate matching parameter for a given number of spatial layers to a first value when the selected transmission mode is a spatial multiplexing mode, to set the rate matching parameter for the given number of the spatial layers to a second value, different from the first value, when the selected transmission mode is a transmit diversity mode, and to format data for transmission in one or more transport blocks, each transport block comprising multiple code blocks having respective lengths, in symbols, that are respective integer multiples of the rate matching parameter;
   a mapping unit, which is configured to map the code blocks of a given transport block onto the given number of the spatial layers and onto time-frequency resource elements in accordance with the selected transmission mode, each resource element corresponding to a respective frequency range that is allocated for a given transmission over a specified time interval, such that each resource element contains data originating from only a respective one of the code blocks of the given transport block; and
   transmission circuitry, which is configured to transmit the code blocks of the given transport block in a MIMO signal over the time-frequency resource elements to a receiver.

10. The transmitter according to claim 9, wherein the mapping unit is configured to map the code blocks onto the resource elements by mapping the code blocks onto the given number of the spatial layers, and mapping the spatial layers onto the resource elements.

11. The transmitter according to claim 10, wherein the rate matching unit is configured to set the rate matching parameter depending on the given number of the spatial layers.

12. The transmitter according to claim 10, wherein the rate matching unit is configured to fix the rate matching parameter to be equal to the given number of the spatial layers when the given number of the spatial layers is between one and three.

13. The transmitter according to claim 10, wherein, when the given number of the spatial layers is four, the rate matching unit is configured to fix the rate matching parameter to be two when the selected transmission mode is the transmit diversity mode, and to fix the rate matching parameter to be four when the selected transmission mode is the spatial multiplexing mode.

14. The transmitter according to claim 9, wherein the rate matching unit is configured to indicate the rate matching parameter to the receiver by signaling at least the selected transmission mode from the transmitter to the receiver using the transmission circuitry.

15. The transmitter according to claim 9, wherein the rate matching unit is configured to report the rate matching parameter from the transmitter to the receiver using the transmission circuitry.

16. The transmitter according to claim 9, wherein the transmission circuitry is configured to transmit the MIMO signal in accordance with a Long Term Evolution Advanced (LTE-A) specification.

17. A system, comprising:
   a Multiple-Input Multiple-Output (MIMO) transmitter, which is configured to select a transmission mode, to set a rate matching parameter for a given number of spatial layers to a first value when the selected transmission mode is a spatial multiplexing mode, to set the rate matching parameter for the given number of the spatial layers to a second value, different from the first value, when the selected transmission mode is a transmit diversity mode, to format data for transmission in one or more transport blocks, each transport block comprising multiple code blocks having respective lengths, in symbols, that are respective integer multiples of the rate matching parameter, to map the code blocks of a given transport block onto the given number of the spatial layers and onto time-frequency resource elements in accordance with the selected transmission mode, each resource element corresponding to a respective frequency range that is allocated for a given transmission over a specified time interval, such that each resource element contains data originating from only a respective one of the code blocks of the given transport block, and to transmit the code blocks of the given transport block in a MIMO signal over the time-frequency resource elements; and
   a receiver, which is configured to receive the MIMO signal from the transmitter and to decode the code blocks based on the rate matching parameter.

18. The system according to claim 17, wherein the transmitter is configured to transmit to the receiver signaling that is indicative of the rate matching parameter, and wherein the receiver is configured to determine the rate matching parameter based on the signaling.

* * * * *